(12) United States Patent
Lunn et al.

(10) Patent No.: US 8,794,485 B2
(45) Date of Patent: Aug. 5, 2014

(54) FROZEN BEVERAGE DISPENSER

(71) Applicants: Malcolm Lunn, The Woodlands, TX (US); Larry Kiliszewski, The Woodlands, TX (US); Brett Triola, Houston, TX (US)

(72) Inventors: Malcolm Lunn, The Woodlands, TX (US); Larry Kiliszewski, The Woodlands, TX (US); Brett Triola, Houston, TX (US)

( * ) Notice: Subject to any disclaimer, the term of this patent is extended or adjusted under 35 U.S.C. 154(b) by 51 days.

(21) Appl. No.: 13/712,794

(22) Filed: Dec. 12, 2012

(65) Prior Publication Data

US 2014/0158710 A1    Jun. 12, 2014

(51) Int. Cl.
*B67D 1/00* (2006.01)
*B67D 3/00* (2006.01)
*B67D 1/14* (2006.01)

(52) U.S. Cl.
CPC ............ *B67D 3/0012* (2013.01); *B67D 3/0016* (2013.01); *B67D 1/1477* (2013.01)
USPC ......................................... 222/63; 222/146.6

(58) Field of Classification Search
CPC ... B67D 3/0012; B67D 3/0016; B67D 1/1477
USPC .............. 222/62, 131, 262, 183; 62/3.6, 3.63, 62/3.64, 3.7, 389–400; 220/592.13–592.15; 366/184, 187, 366/197–207, 601
See application file for complete search history.

(56) References Cited

U.S. PATENT DOCUMENTS

| | | | | |
|---|---|---|---|---|
| 1,892,547 | A * | 12/1932 | Benham et al. | 222/244 |
| 3,045,869 | A * | 7/1962 | Rodth et al. | 222/39 |
| 3,664,643 | A * | 5/1972 | La Neve | 366/149 |
| 6,176,562 | B1 * | 1/2001 | Hart | 312/351.1 |
| 6,527,433 | B2 * | 3/2003 | Daniels, Jr. | 366/205 |

* cited by examiner

*Primary Examiner* — Lien Ngo
(74) *Attorney, Agent, or Firm* — Patrick Caldwell; James Harrison

(57) ABSTRACT

A system for dispensing a beverage includes a conical inner sleeve configured to receive a mixture of beverage components, a first blade, and a blade arm. An outer shell receives the first blade, blade arm, and the inner sleeve. A top couples the inner sleeve and outer shell in a fixed position. A tap module includes a tap handle and a tap control. The tap handle restricts and allows beverage flow through a beverage port. The tap control detects whether the tap handle is in a first position or a second position. The tap control prevents a motor from operation while the tap handle is in the first position and engages the motor while the tap handle is in the second position.

20 Claims, 12 Drawing Sheets

FIG. 1
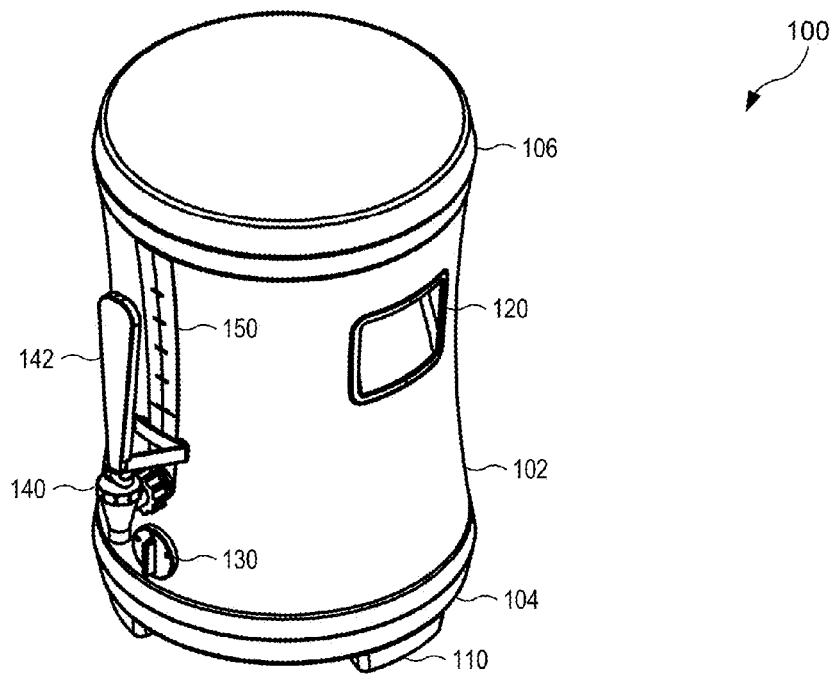
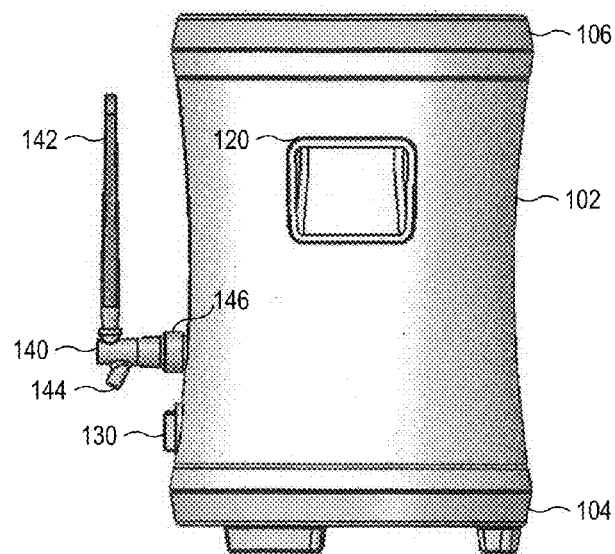

FROZEN BEVERAGE DISPENSER

TECHNICAL FIELD

The present invention relates generally to the field of food preparation and, more particularly, to a frozen beverage dispenser.

BACKGROUND

Modern food preparation often includes preparation outside of a typical kitchen environment. As such, techniques have been developed for food preparation at, for example, catered events. Similarly, modern beverage preparation also often includes preparation outside of a fixed-location bar. For example, at catered events, one or more temporary beverage preparation workstations typically include items routinely found at full-service bars.

Blended beverages require additional equipment, which typically require access to electricity. In temporary beverage workstations, access to electricity can dictate suitable locations to establish such temporary beverage workstations. Most typical temporary beverage stations can only accommodate a small blender, suitable for lower quantity production. Low quantity production can result in customers dissatisfied with long wait times.

Full fixed-location bars also frequently have a machine dedicated to make frozen beverages, especially margaritas. Temporary beverage workstations at events where high margarita consumption is expected typically do not include a dedicated margarita machine. Instead, typical setups use premade margaritas stored in a cooler or other container.

But storing margaritas (and other frozen/blended beverages) makes the beverage quality and consistency difficult to maintain. For example, in some cases, the alcohol does not get mixed properly with the other beverage components. Further, in some cases, the frozen and less-frozen parts of the mixture do not blend well together and tend to separate in storage. Poorly blended drinks can result in dissatisfied customers.

In some cases, temporary beverage stations include portable margarita machines. But typical portable margarita machines are bulky, difficult to use, consume a lot of electricity, and are expensive. Moreover, non-commercial uses are usually cost-prohibitive.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

A system for dispensing a beverage includes a conical inner sleeve comprising a first beverage port. The conical inner sleeve receives a mixture of beverage components and a first blade and a blade arm. The first blade couples to a first end of the blade arm. An outer shell comprises a second beverage port and receives the first blade and blade arm and the inner sleeve. A top couples the inner sleeve and the outer shell in a fixed position, aligning the first beverage port and the second beverage port. A tap module couples to the outer shell and comprises a third beverage port, a tap handle, and a tap control. The tap module couples to the outer shell to align the third beverage port with the second beverage port. The tap handle restricts flow through the third beverage port in a first position and permits flow through the third beverage port in a second position. The tap control detects whether the tap handle is in the first position or the second position. The tap control controls a motor, preventing the motor from operation while the tap handle is in the first position and engaging the motor while the tap handle is in the second position. The motor rotates the blade arm so as to rotate the first blade, in response to control by the tap control. A base unit houses the motor and couples to the outer shell.

In one embodiment, the inner sleeve includes a first view port allowing visual inspection of the mixture of beverage components and the outer shell includes a second view port allowing visual inspection of the mixture of beverage components through the first view port. In one embodiment, the inner sleeve includes a notch and the outer shell includes a channel configured to receive the notch.

In one embodiment, the outer shell further comprises hand grips. In one embodiment, the outer shell further comprises an insulation layer. In one embodiment, the outer shell further comprises an ice pack module.

In one embodiment, the tap control further comprises a magnetic sensor. In one embodiment, the tap control further comprises a fluid level sensor. In one embodiment, the tap control is further configured to control operation of the motor based on a fluid level detected by the fluid level sensor.

In one embodiment, a second blade couples to the blade arm and rotates with the blade arm. In one embodiment, a second blade couples to the blade arm and rotates with the blade arm and the first blade and the second blade are configured with different shapes. In one embodiment, a second blade couples to the blade arm and rotates with the blade arm and the second blade is configured with a shape suitable for chopping ice. In one embodiment, a second blade couples to the blade arm and rotates with the blade arm and the tap control is further configured to engage the second blade only if a fluid level in the inner sleeve is sufficient to submerge the second blade.

In one embodiment, a flavor module couples to the tap module. The flavor module includes a forth beverage port configured to align with the third beverage port and injects a flavor additive into liquid passing through the third beverage port.

In one embodiment, a safety switch prevents motor operation unless the inner sleeve and the outer shell are coupled in the fixed position. In one embodiment, the tap control comprises a three-way power switch.

In one embodiment, a speaker module couples to the base unit and is configured to receive audio input and to generate audible output based on received audio input. In one embodiment, a speaker module couples to the base unit and includes a user interface and an input port, the input port being configured to receive audio input. The speaker module being generates audible output based on received audio input.

In one embodiment, the top further comprises a hatch configured to allow access to the inner shell without decoupling the inner sleeve and the outer shell.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 1 presents a high-level overview illustrating certain components of a beverage dispenser system, in accordance with one embodiment of the present invention.

DETAILED DESCRIPTION

Figure 2:
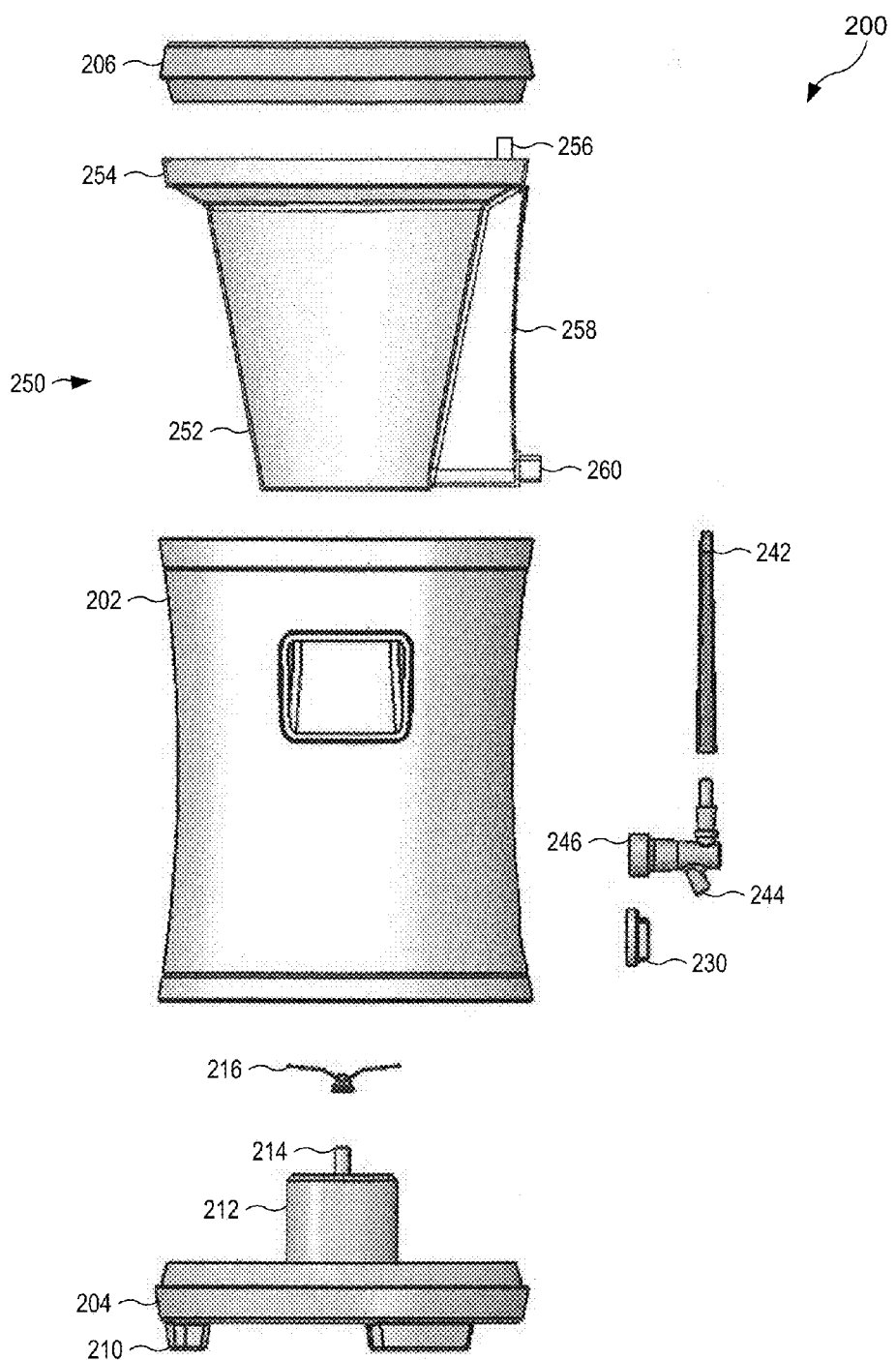
FIG. 2 shows an expanded view of a beverage dispenser system in accordance with one embodiment.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

Referring now to the drawings, FIG. 1 presents a high-level overview illustrating certain components of a beverage dispenser system 100, in accordance with one embodiment of the present invention. Generally system 100 is configured to store, maintain, and dispense a beverage for human consumption.

In one embodiment, system 100 is configured to dispense a "frozen beverage." As used herein, a "frozen beverage" includes potable beverages intended for consumption as a mixture of components blended with ice, ice cream, fruit, and/or other solids. In one embodiment, the beverage is a frozen margarita. One of ordinary skill in the art will understand that a frozen margarita is a cocktail, typically a blended mixture of tequila, triple sec, lime juice, sour mix, and ice. For ease of explanation, the embodiments disclosed herein will be described with respect to dispensing a frozen margarita. Suitable modifications for other beverages will be apparent to one of ordinary skill in the art.

In the illustrated embodiment, system 100 includes an outer shell 102 (which contains an inner sleeve (not shown)), a base 104, and a top 106. Generally, outer shell 102 is configured to receive an inner sleeve, the inner sleeve being configured to contain the components used to produce the desired beverage (e.g., ice, tequila, margarita mix, etc.). In one embodiment, outer shell 102 is constructed of materials suitable for construction of a typical beverage cooler (e.g., plastic, insulation, metal, etc.). In one embodiment, outer shell 102 is configured in approximately the same size as an otherwise conventional five gallon cooler. In one embodiment, outer shell 102 is configured in approximately the same size as an otherwise conventional three gallon cooler.

Generally, base 104 is configured to couple to outer shell 102 and to provide a stable base for outer shell 102 and the remaining components of system 100. In the illustrated embodiment, base 104 is shown as a contiguous feature of outer shell 102. In an alternate embodiment, base 104 is a separate component of system 100. In one embodiment, base 104 is detachably coupled to outer shell 102.

In the illustrated embodiment, base 104 includes one or more legs 110. Generally, legs 110 are configured to provide additional support to base 104 and to elevate base 104 off of the surface on which base 104 rests.

As described in more detail below, in one embodiment, top 106 is an otherwise conventional cooler top, modified as described herein. Generally, top 106 detachably couples to outer shell 102 (and/or an inner sleeve). In one embodiment, top 106 is configured to couple outer shell 102 and an inner sleeve in a fixed position relative to each other, as described in more detail below.

In one embodiment, top 106 is configured to serve as a top to the container otherwise formed by the inner sleeve, to prevent the beverage components from spilling out of the opening in the outer shell 102 and/or inner sleeve, to prevent unwanted debris from falling into the outer shell 102 and contaminating the beverage components.

In the illustrated embodiment, outer shell 102 includes a number of additional features. For example, in the illustrated embodiment outer shell 102 includes hand grips 120. Generally, hand grips 120 are configured to provide grasping points on outer shell 102. In the illustrated embodiment, hand grips 120 are indentations in outer shell 102. In an alternate embodiment, hand grips 120 are handles attached to outer shell 102. One skilled in the art will appreciate that other configurations can also be employed.

In the illustrated embodiment, outer shell 102 also includes a switch 130. Generally, switch 130 is configured to provide a mechanism for the user to select power modes for system 100. In one embodiment, switch 130 is a 3-way switch. In one embodiment, switch 130 is configured with three settings, "ON," "OFF," and "AUTO." Additional details are described below.

In the illustrated embodiment, outer shell 102 also includes a tap module 140. In the illustrated embodiment, tap module 140 includes a handle 142 and a spout 144. Generally, tap module 140 is configured to provide a control interface for the user to initiate beverage dispensation. In one embodiment, a user manipulates tap handle 142, causing a motor to engage a blade (described below), stirring the beverage components, and dispensing the stirred beverage components out of the spout 144. Additional details are described below.

In the illustrated embodiment, outer shell 102 also includes a viewport 150. Generally, viewport 150 is configured to allow visual inspection of the fluid level inside the inner sleeve. In one embodiment, viewport 150 includes hash marks corresponding to various volume measurements.

FIG. 2 shows an expanded view of a beverage dispenser system 200 in accordance with one embodiment. In the illustrated embodiment, system 200 includes an outer shell 202, which contains an inner sleeve 250, a base 204, and a top 206. Generally, outer shell 202 is configured to receive an inner sleeve, the inner sleeve being configured to contain the components used to produce the desired beverage (e.g., ice, tequila, margarita mix, etc.). In one embodiment, outer shell 202 is constructed of materials suitable for construction of a typical beverage cooler (e.g., plastic, insulation, metal, etc.). In one embodiment, outer shell 202 is configured in approximately the same size as an otherwise conventional five gallon cooler. In one embodiment, outer shell 202 is configured in approximately the same size as an otherwise conventional three gallon cooler.

In the illustrated embodiment, outer shell 202 includes hand grips 220. Generally, hand grips 220 are configured to provide grasping points on outer shell 202. In the illustrated embodiment, hand grips 220 are indentations in outer shell 202. In an alternate embodiment, hand grips 220 are handles attached to outer shell 202. One skilled in the art will appreciate that other configurations can also be employed.

Generally, base 204 is configured to couple to outer shell 202 and to provide a stable base for outer shell 202 and the remaining components of system 200. In the illustrated embodiment, base 204 is shown as a separate component of system 200. In one embodiment, base 204 is detachably coupled to outer shell 202.

In the illustrated embodiment, base 204 includes one or more legs 210. Generally, legs 210 are configured to provide additional support to base 204 and to elevate base 204 off of the surface on which base 204 rests. In the illustrated embodiment, base 204 includes a motor 212. Generally, motor 212 is an otherwise conventional motor, configured to rotate a blade arm 214, to which couples a blade 216. In one embodiment, motor 212 is configured to operate in response to operation of a switch 230 and/or tap handle 242, as described in more detail below.

Generally, blade arm 214 is configured to rotate under power from motor 212, and to rotate an attached blade 216. Generally, blade 216 is configured to blend the mixture inside inner sleeve 250. In one embodiment, blade 216 is configured to chop ice.

As described in more detail below, in one embodiment, top 206 is an otherwise conventional cooler top, modified as described herein. Generally, top 206 detachably couples to outer shell 202 and/or inner sleeve 250. In one embodiment, top 206 is configured to couple outer shell 202 and inner sleeve 250 in a fixed position relative to each other, as described in more detail below.

In one embodiment, top 206 is configured to serve as a top to the container otherwise formed by the inner sleeve, to prevent the beverage components from spilling out of the opening in the outer shell 202 and/or inner sleeve 250, to prevent unwanted debris from falling into the outer shell 202 and contaminating the beverage components. As described in more detail below, in one embodiment, top 206 is configured to activate switch 256 when outer shell 202 and inner sleeve 250 are aligned. As described in more detail below, in one embodiment, motor 212 is configured to operate only when switch 256 is activated (indicating that outer shell 202 and inner sleeve 250 are aligned).

In the illustrated embodiment, system 200 includes inner sleeve 250. Generally, inner sleeve 250 is configured to couple to outer shell 202. In one embodiment, inner sleeve 250 is configured to fit inside a cavity defined by outer shell 202. Generally, inner sleeve 250 is configured to be detachable from outer shell 202, which improves ease of cleaning. In one embodiment, inner sleeve 250 is configured to fit within a standard home dishwashing machine. In one embodiment, inner sleeve 250 is configured to be detachable from outer shell 202 and configured for easy cleaning in a standard home kitchen sink. In the illustrated embodiment, inner sleeve 250 includes a conical portion 252, a lip 254, a switch 256, a view port 258, a beverage port 260, and a notch portion 262. In one embodiment, notch portion 262 is configured to fit within a corresponding slot in outer shell 202.

Generally, conical portion 252 is configured to define a cavity suitable to contain beverage components. Generally, conical portion 252 is configured as a conical cylinder, with a first end having an opening of a larger diameter than a diameter of an opening of a second end. In one embodiment, conical portion 252 also includes an aperture configured to receive blade arm 214. In one embodiment, the narrowest portion of conical portion 252 is configured to provide sufficient clearance for blade 216 to rotate freely. In one embodiment, conical portion 252 is configured to improve movement of the beverage components during mixing.

Generally, lip 254 is configured to couple to outer shell 202 and lid 206. In one embodiment, lip 254 is configured to fit snugly against a top portion of outer shell 202. In the illustrated embodiment, a switch 256 couples to lip 254. In one embodiment, switch 256 is configured to operate in an active position when top 206 couples to outer shell 202 in a predetermined manner. In one embodiment, switch 256 operates as a safety switch, preventing operation of motor 212 unless top 206 is seated properly. Generally, top 206 is seated properly when outer shell 202 and inner sleeve 250 are aligned and top 206 is securely coupled to outer shell 202.

In the illustrated embodiment, inner sleeve 250 also includes a viewport 258. Generally, viewport 258 is configured to allow visual inspection of the fluid level inside inner sleeve 250. In one embodiment, viewport 258 includes hash marks corresponding to various volume measurements. Generally, viewport 258 is also configured to align with a viewport of outer shell 202, such as view port 150 of FIG. 1, for example. In the illustrated embodiment, view port 250 is configured as part of a notch portion 262. Generally, notch portion 262 is configured to fit within a slot of outer shell 202 and serves to help ensure outer shell 202 and inner sleeve 250 are properly aligned.

In the illustrated embodiment, inner shell 250 also includes a beverage port 260. Generally, beverage port 260 is an aperture configured to allow fluid to pass from the inside of inner sleeve 250 through outer shell 202, into tap module 240, as described in more detail below.

In the illustrated embodiment, system 200 also includes a tap module 240. In the illustrated embodiment, tap module 240 includes a handle 242, a spout 244, and a beverage port 246. Generally, tap module 240 is configured to provide a control interface for the user to initiate beverage dispensation. Generally, handle 242 is a user control configured to operate a valve to permit fluid to flow through tap module 240. In one embodiment, handle 242 is also configured to operate a switch configured to engage motor 212. As described in more detail below, in one embodiment, a user manipulates tap handle 242, causing motor 212 engage blade 216 (via blade arm 214), stirring the beverage components, and dispensing the stirred beverage components from beverage port 260, through beverage port 246, and out of spout 244.

In the illustrated embodiment, system 200 also includes a switch 230. Generally, switch 230 is configured to provide a mechanism for the user to select power modes for system 200. In one embodiment, switch 230 is a 3-way switch. In one embodiment, switch 230 is configured with three settings, "ON," "OFF," and "AUTO." In one embodiment, switch 230 in the OFF position prevents motor 212 from operation. In one embodiment, switch 230 in the ON position engages motor 212. In one embodiment, switch 230 in the AUTO position permits operation of motor 212, subject to tap module 240.

Figure 3:
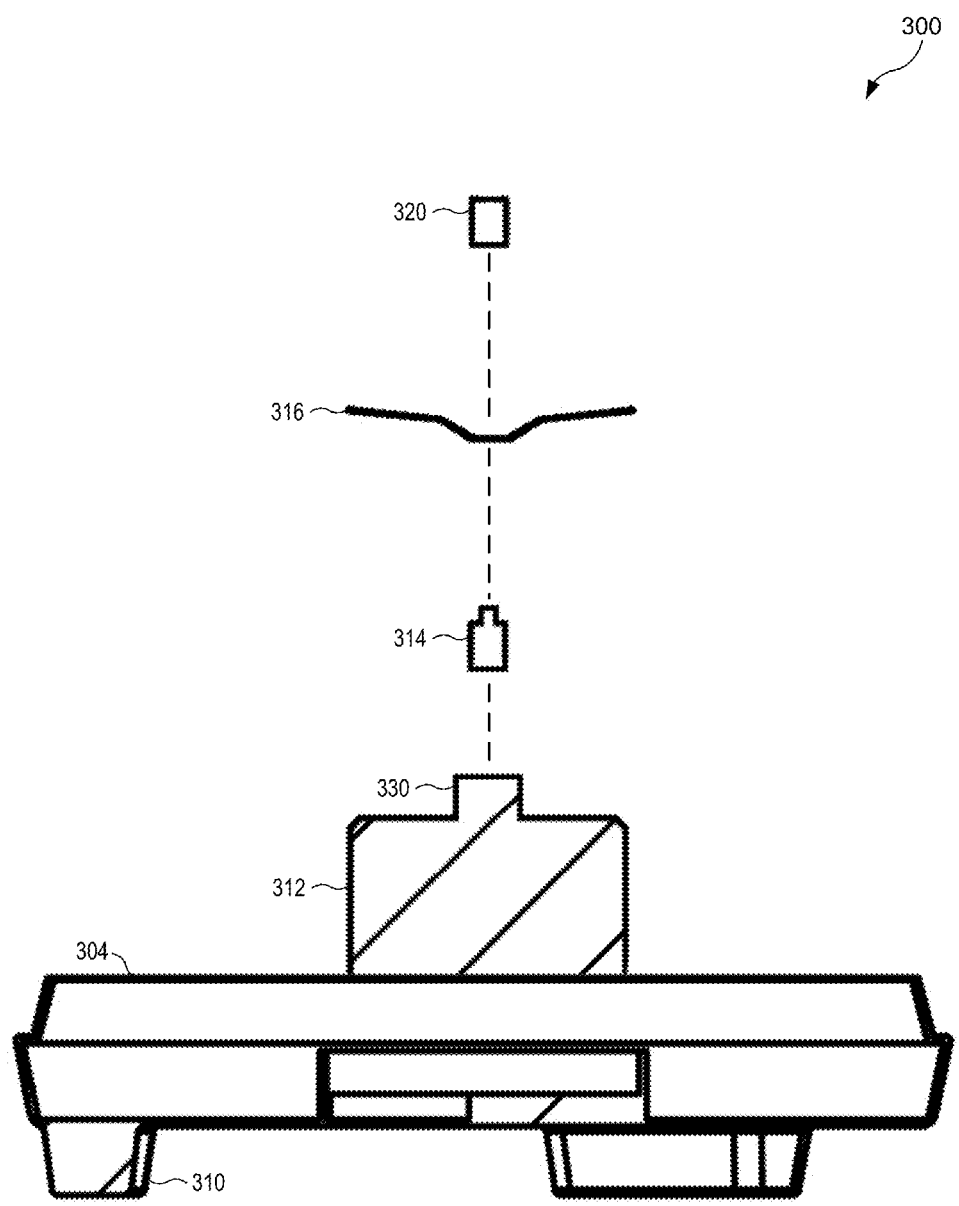
FIG. 3 presents a single blade embodiment of a beverage dispenser system in accordance with one embodiment.

As described above, in one embodiment, system 200 includes a single blade 216. FIG. 3 presents a single blade embodiment in additional detail. Specifically, FIG. 3 illustrates a system 300, which includes a base 304.

Generally, base 304 is configured to couple to an outer shell, such as outer shell 202 of FIG. 2, for example, and to provide a stable base for the outer shell and the remaining components of the system in which system 300 is employed. In the illustrated embodiment, base 304 includes one or more legs 310. Generally, legs 310 are configured to provide additional support to base 304 and to elevate base 304 off of the surface on which base 304 rests.

In the illustrated embodiment, base 304 includes a motor 312. Generally, motor 312 is an otherwise conventional motor, configured to rotate a blade arm 314, to which couples a blade 316. In one embodiment, motor 312 is configured to operate in response to operation of a switch and/or tap handle, as described in more detail below.

In the illustrated embodiment, system 300 includes an endcap 320. Generally, endcap 320 is configured to couple blade 316 to blade arm 314. In one embodiment, endcap 320 is configured to be removable, so as to allow for ease of cleaning of blade 316.

Similarly, in the illustrated embodiment, motor 312 includes a blade arm housing 330. Generally, blade arm housing 330 is configured to receive blade arm 314 so that blade arm 314 may be detachably coupled to motor 312. Generally, this configuration allows blade arm 314 to be removable, so as to allow for ease of cleaning of blade 316.

Figure 4:
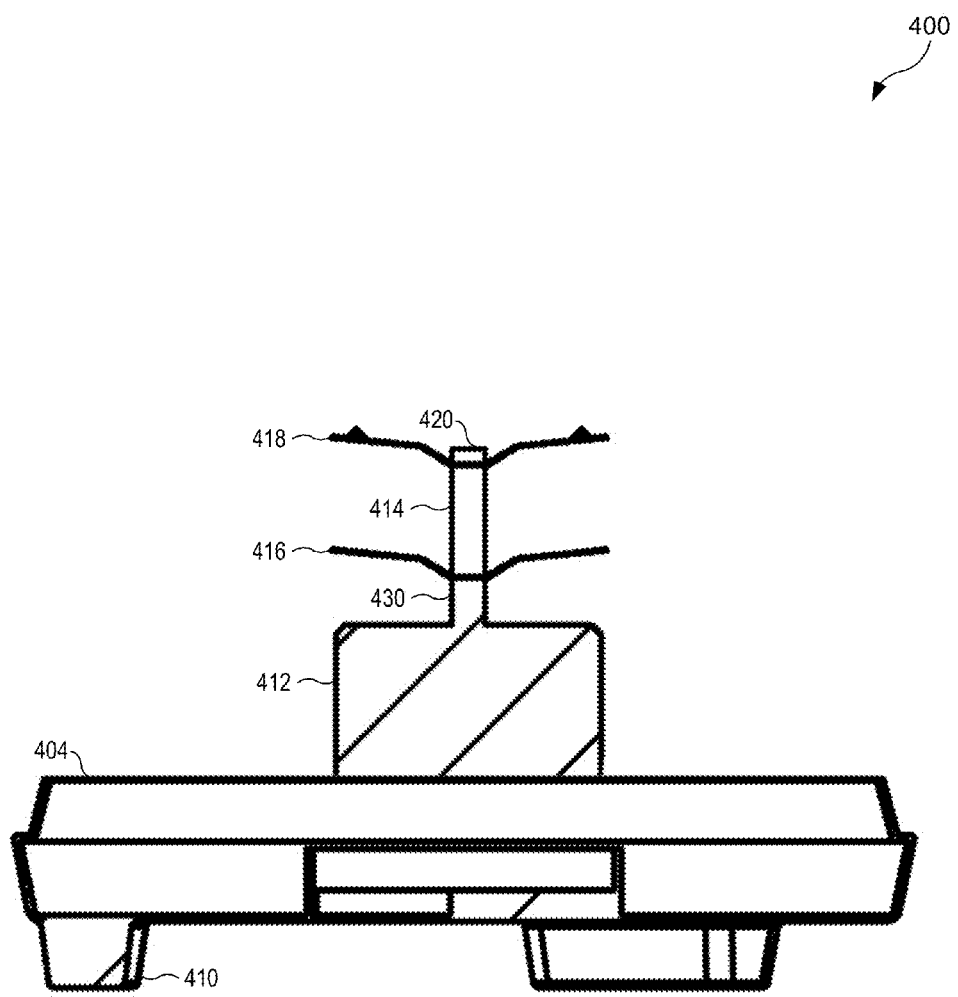
FIG. 4 presents a multiple blade embodiment of a beverage dispenser system in accordance with one embodiment.

In one embodiment, more than one blade can be employed. FIG. 4 presents a multiple blade embodiment in additional detail. Specifically, FIG. 4 illustrates a system 400, which includes a base 404.

Generally, base 404 is configured to couple to an outer shell, such as outer shell 202 of FIG. 2, for example, and to provide a stable base for the outer shell and the remaining components of the system in which system 400 is employed. In the illustrated embodiment, base 404 includes one or more legs 410. Generally, legs 410 are configured to provide additional support to base 404 and to elevate base 404 off of the surface on which base 404 rests.

In the illustrated embodiment, base 404 includes a motor 412. Generally, motor 412 is an otherwise conventional motor, configured to rotate a blade arm 414, to which couples a blade 416 and a blade 418. In one embodiment, motor 412 is configured to operate in response to operation of a switch and/or tap handle, as described in more detail below.

In the illustrated embodiment, motor 412 includes a blade arm housing 430. Generally, blade arm housing 430 is configured to receive blade arm 414 so that blade arm 414 may be detachably coupled to motor 412. Generally, this configuration allows blade arm 414 to be removable, so as to allow for ease of cleaning of blade 416 and blade 418.

In the illustrated embodiment, blade arm 414 is configured to couple to two blades, blade 416 and blade 418. In one embodiment, blade arm 414 is configured to allow blade 416 and blade 418 to rotate independently. In one embodiment, blade arm 414 is configured to rotate blade 416 and blade 418 together. In the illustrated embodiment, blade arm 414 is also configured to couple to blade arm housing 420 so as so secure blade 416.

In the illustrated embodiment, blade 416 and blade 418 are configured with different shapes. In the illustrated embodiment, blade 416 is configured to mix the beverage components and blade 418 is configured to chop ice. One of ordinary skill in the art will appreciate that there are a wide variety of blade shapes available. As such, blade 416 and blade 428 can be configured in any manner suitable for the expected beverage to be dispensed in the system in which system 400 is employed. For example, blades 418 and/or blade 418 can be configured to improve performance for beverages that require a higher percentage of ice, or vegetables, etc.

In the illustrated embodiment, system 400 includes an endcap 420. Generally, endcap 420 is configured to couple blade 418 to blade arm 414. In one embodiment, endcap 420 is configured to be removable, so as to allow for ease of cleaning of blade 418 and/or blade 416.

Figure 5:
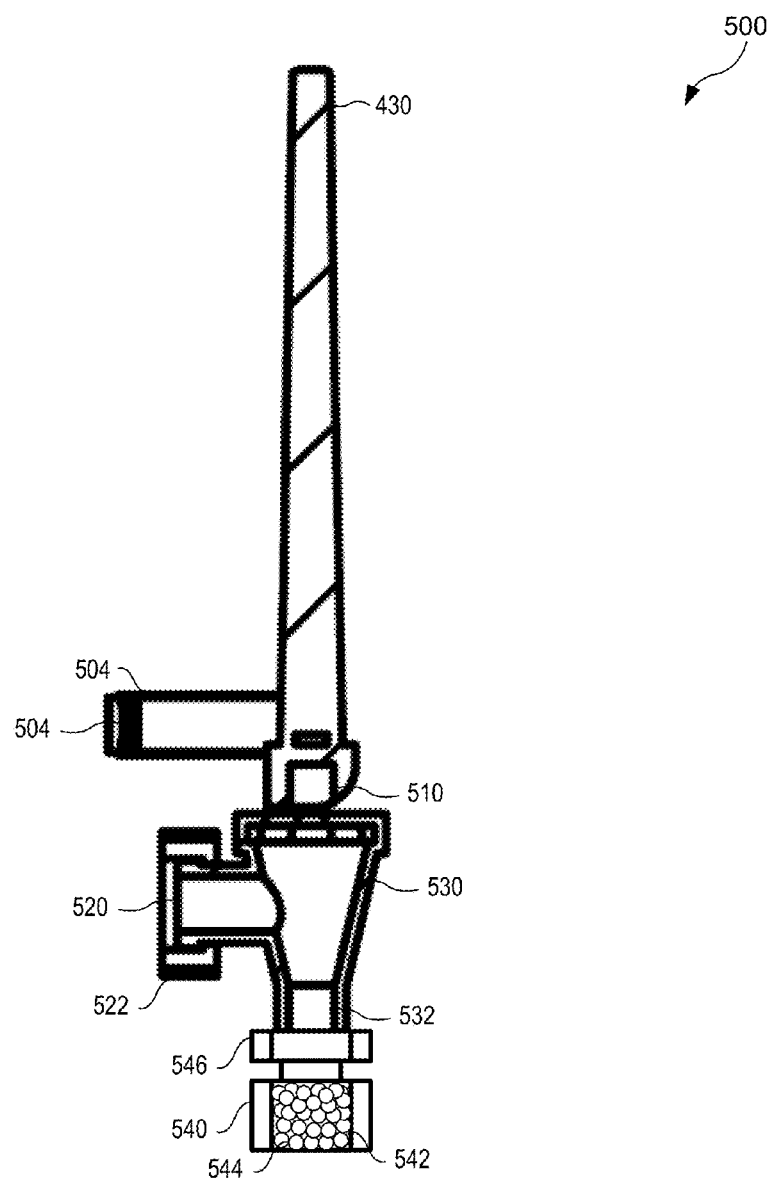
FIG. 5 illustrates a tap module of a beverage dispenser system in accordance with one embodiment.

As described above, in one embodiment, motor 412 (or other motors described herein) can be configured to operate under control of a tap module. FIG. 5 illustrates a tap module 500 in accordance with one embodiment. Generally, tap module 500 is configured to provide a control interface for the user to initiate beverage dispensation.

In the illustrated embodiment, tap module 500 includes a tap handle 502. Generally, handle 502 is a user control configured to operate a valve to permit fluid to flow through tap module 500. In one embodiment, handle 502 is also configured to operate a switch configured to engage a motor, such as motor 212 of FIG. 2, for example. As described in more detail below, in one embodiment, a user manipulates tap handle 502, causing a motor to engage a blade, stirring the beverage components inside the inner sleeve, and dispensing the stirred beverage components from the inner sleeve beverage port, through the outer shell beverage port, through a tap module beverage port, and out of a tap module spout.

In the illustrated embodiment, tap module 500 includes a tap stabilizer 504. Generally, tap stabilizer 504 is configured to provide additional support to tap module 500 when coupled to an outer shell. In the illustrated embodiment, tap stabilizer 504 is configured to rest against an outer shell along outer shell edge 506. One skilled in the art will appreciate that there are a variety of stabilization options available that are also consistent with the embodiments disclosed herein.

In the illustrated embodiment, tap handle 502 is configured to control operation of a tap valve 510. Generally, tap valve 510 is configured to control operation of a motor, such as motor 212 of FIG. 2, for example. In one embodiment, tap valve 510 can include a magnetic sensor, an electronic sensor, or other suitable sensor to detect the position of tap handle 502. Additionally, in the illustrated embodiment, tap valve 510 is configured to restrict or allow fluid to pass through tap module 500 in response to user manipulation of tap handle 502.

For example, in the illustrated embodiment, tap module 500 includes a beverage port 520, a spout module 530, and a spout 532. Generally, beverage port 520 is configured to couple to an inner sleeve beverage port and/or an outer shell beverage port so as to allow fluid flow from the inner sleeve (and/or outer shell) beverage port, through beverage port 520. In the illustrated embodiment, beverage port 520 includes a coupling 522 configured to couple beverage port 520 to an inner sleeve beverage port and/or an outer shell beverage port.

In the illustrated embodiment, beverage port 520 couples to a spout module 530. Generally, beverage port 520 couples to spout module 530 so as to allow fluid flow from beverage port 520 through spout module 530. In the illustrated embodiment, spout module 530 is an otherwise conventional beverage tap, configured with a spout 532. One skilled in the art will understand that both beverage port 520 and spout module 530 can be configured for improved performance based on the characteristics (e.g., viscosity) of the expected beverage to be dispensed by the system in which tap module 500 is employed.

In the illustrated embodiment, tap module 500 also includes a flavor module 540. Generally, flavor module 540 is configured to receive a beverage, optionally add flavor to the beverage, and to dispense the beverage. In the illustrated embodiment, flavor module 540 defines a cavity 542. In the illustrated embodiment, cavity 542 contains flavor 544. Generally, flavor 544 is configured to inject a flavor additive into fluid passing through flavor module 540. In one embodiment, flavor 544 is a collection of resin particles. In an alternate embodiment, flavor 544 is a porous bag, such as a tea bag, containing flavor. One skilled in the art will understand that there exist various suitable options for adding flavor to a beverage during dispensation, including injecting syrup or other flavored liquids into the dispensation flow.

In the illustrated embodiment, flavor module 540 couples to spout 532 via a coupling 546. In the illustrated embodiment, coupling 546 is a threaded nut. One skilled in the art will appreciate that other couplings can also be employed.

In the illustrated embodiment, flavor module 540 couples to spout module 530 so as to inject flavor into all fluid flow through spout module 530. In an alternate embodiment, spout module 530 can be configured with a bypass to allow fluid through flavor module 540 without injecting flavor additives into the fluid flow. Additionally, in one embodiment, tap module 500 can be configured to allow bypass of flavor module 540 by manipulation of tap handle 502.

Thus, tap module 500 can be configured to control flow through flavor module 540 and/or spout module 530, and to control motor functions, as described in more detail below. Additionally, tap module 500 can be configured to operate in response to various sensors in the system in which it is employed.

Figure 6:
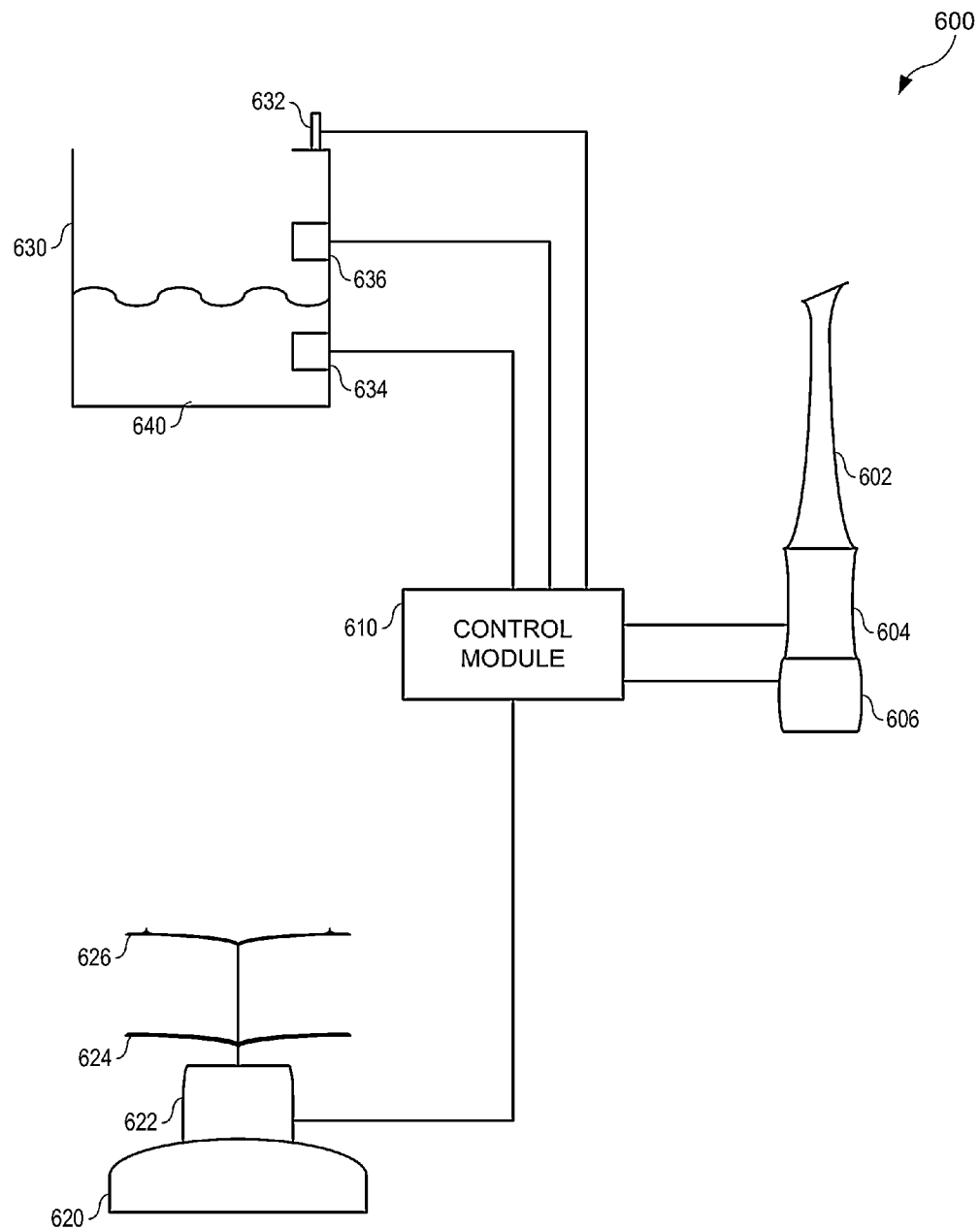
FIG. 6 illustrates an exemplary operational diagram of a beverage dispenser system in accordance with one embodiment.

For example, FIG. 6 illustrates an exemplary operational diagram of a system 600 in accordance with one embodiment. Generally, the elements of system 600 correspond with appropriate elements as described above. Generally, the elements are illustrated in FIG. 6 as abstracted element for ease of explanation. One skilled in the art will appreciate that certain details have been omitted as generally understood by those of ordinary skill in the relevant art.

In the illustrated embodiment, system 600 includes a tap handle 602 coupled to a tap control 604. Generally, tap handle 602 is configured to serve as a user interface to provide mechanical inputs to system 600. In the illustrated embodiment, tap control 604 couples to a control module 610. In the illustrated embodiment, tap control 604 is configured to receive mechanical inputs from tap handle 602 and to provide control inputs to control module 610 based on received mechanical inputs. In one embodiment, tap control 604 includes a magnetic sensor.

Generally, control module 610 controls operation of mixing and dispensation operations based on input from tap control 604 and various sensors of system 600. In one embodiment, control module 610 is configured to receive various inputs from elements of system 600 and to provide control signals to operate certain elements of 600 as described in more detail below. For example, system 600 includes a flavor module 606 coupled to tap control 604 and control module 610. In the illustrated embodiment, control module 610 is configured to send control signals to flavor module 606 in response to control inputs received from tap control 604. In one embodiment, flavor module 606 is configured to inject a flavor additive into a dispensing beverage based on control signals received from control module 610.

In the illustrated embodiment, control module 610 also couples to a motor 622 (housed in a base 620). In one embodiment, control module 610 is configured to send control signals to motor 622 in response to control inputs received from tap control 604. Generally, motor 622 drives operation of blades 624 and 626 in response to control signals received from control module 610. In one embodiment, motor 622 drives blades 624 and 626 concurrently. In one embodiment, motor 622 drives blades 624 and 626 independently. In the illustrated embodiment, blades 624 and 626 are shown separate from inner sleeve 630, for ease of operation. In operation, however, blades 624 and 626 are disposed within the cavity defined by inner sleeve 630. Generally, blades 624 and 626 are configured to mix and/or blend the beverage components within inner sleeve 630.

In the illustrated embodiment, control module 610 also couples to sensors of an inner sleeve 630. In the illustrated embodiment, inner sleeve 630 includes a safety switch 632, a low sensor 634, and high sensor 636. In one embodiment, safety switch 632 is an otherwise conventional pressure switch. In the illustrated embodiment, safety switch 632 is configured to detect whether a lid (not shown) is properly seated on inner sleeve 630 (and/or an outer shell, as described above). In one embodiment, control module 610 couples to safety switch 632 and is configured to prevent operation of motor 622 unless safety switch 632 indicates that the lid is properly seated.

Generally, inner sleeve 630 contains beverage mixture 640. In the illustrated embodiment, low sensor 624 and high sensor 636 couple to control module 610 and are configured to detect a fluid level within the cavity defined by inner sleeve 630. In one embodiment, low sensor 624 and high sensor 636 are otherwise conventional fluid level sensors. In the illustrated embodiment, beverage mixture 640 is shown at a level above low sensor 634 and below sensor 636.

In one embodiment, low sensor 634 is disposed at a location on inner sleeve 630 corresponding to a beverage level sufficient to submerge blade 624. In one embodiment, high sensor 636 is disposed at a location on inner sleeve 630 corresponding to a beverage level sufficient to submerge blade 626. In one embodiment, control module 610 prevents operation of blade 626 unless high sensor 636 indicates that beverage mixture 640 submerges blade 626. In one embodiment, control module 610 prevents operation of blade 624 unless low sensor 634 indicates that beverage mixture 640 submerges blade 624.

One skilled in the art will understand that system 600 can be configured in a variety of ways, responding to specific manual inputs by a user manipulating tap handle 602. For example, FIG. 7 illustrates exemplary tap handle positions and corresponding operational states of components of FIG. 600 in accordance with one embodiment.

Figure 7:
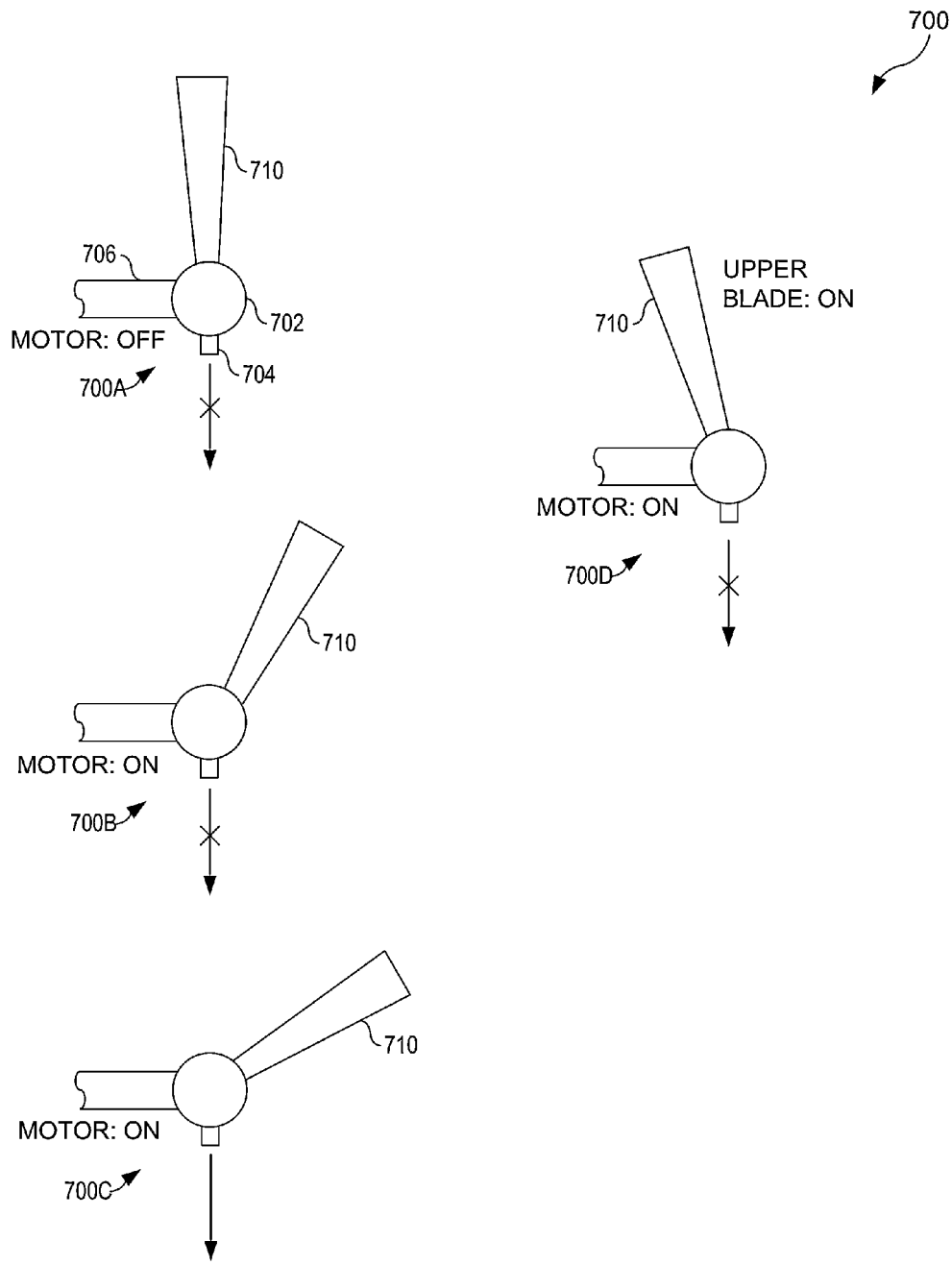
FIG. 7 presents a number of state configurations of a beverage dispenser system in accordance with one embodiment.

Referring now to FIG. 7, diagram 700A illustrates a tap control 702 coupled to a tap spout 704 and a beverage port 706 (coupled to an inner sleeve and/or outer sleeve beverage port (not shown)). In the illustrated embodiment, tap handle 710 is in a "neutral" position, the motor is OFF, and flow from spout 704 is OFF.

Diagram 700B illustrates a "blend" position. In the illustrated embodiment, tap handle 710 is slightly offset from the neutral position, away from beverage port 706, the motor is ON, and flow from spout 704 is OFF.

Diagram 700C illustrates a "dispense" position. In the illustrated embodiment, tap handle 710 is more offset from the neutral position than the "blend" position, away from beverage port 706, the motor is ON, and flow from spout 704 is ON.

Diagram 700D illustrates a "chop ice" position. In the illustrated embodiment, tap handle 710 is slightly offset from the neutral position, towards beverage port 706, the motor is ON, the upper blade is ON, and flow from spout 704 is OFF. Thus, FIG. 7 illustrates one configuration of control inputs and control states for the disclosed embodiments, in accordance with one embodiment.

Figure 8:
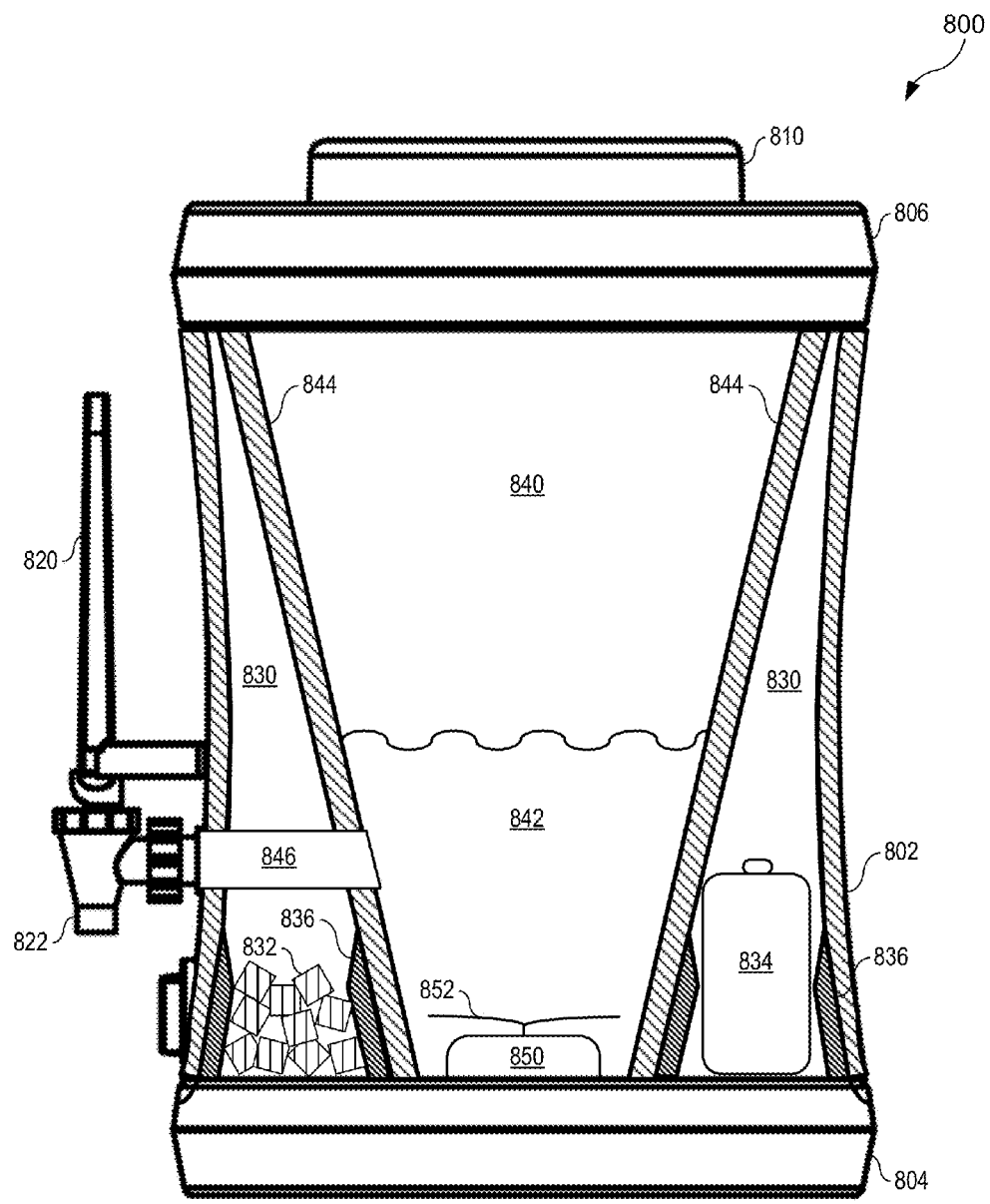
FIG. 8 presents a beverage dispenser system in accordance with one embodiment.

As described above, the disclosed embodiments can include additional features. For example, FIG. 8 illustrates a system 800, which includes an outer shell 802, a base 804, and a top 806. In the illustrated embodiment, outer shell 802 and base 804 are configured as described above with respect to FIGS. 1 and 2. In the illustrated embodiment, top 806 includes a hatch 810. Generally, hatch 810 is configured to allow access to an aperture of top 806, to allow addition of ice and other beverage mixtures to the inner sleeve 840 without requiring removal of top 806. In one embodiment, hatch 810 is configured to restrict access such that ice and liquid can pass through hatch 810, but hands and arms, or leaves and other debris cannot pass through hatch 810.

In the illustrated embodiment, system 800 includes a tap module substantially as described above in various embodiments. For example, system 800 includes a tap handle 820 and spout 822, which couple to inner sleeve 840 through a beverage port 846. Generally, beverage port 846 is configured to allow beverage components 842 from inner sleeve 840 to pass through spout 822 (according to input received from the user through tap handle 820).

In the illustrated embodiment, system 800 includes a conical inner sleeve 840. In the illustrated embodiment, the conical shape of inner sleeve 840 is configured to form a cavity suitable to contain beverage components 842. In the illustrated embodiment, inner sleeve 840 includes sidewalls 844 (shown in cutaway). As shown, sidewalls 844 form a conical shape to inner sleeve 840.

As such, there is a cavity 830 formed between sidewalls 844 and outer shell 802. In one embodiment, cavity 830 is configured to receive ice 832, an ice pack 834, or other suitable cooling and/or insulating agent. In one embodiment, outer shell 803 includes guide walls 836. Generally, guide walls 836 are configured to align inner sleeve 840 within outer shell 802 and to provide a repository for one or more cooling/insulating agents.

In the illustrated embodiment, system 800 also includes a motor 850, configured to drive a blade 852. As described above, in one embodiment, system 800 is configured to operate blade 852 in response to user input provided by manipulation of tap handle 820.

Figure 9:
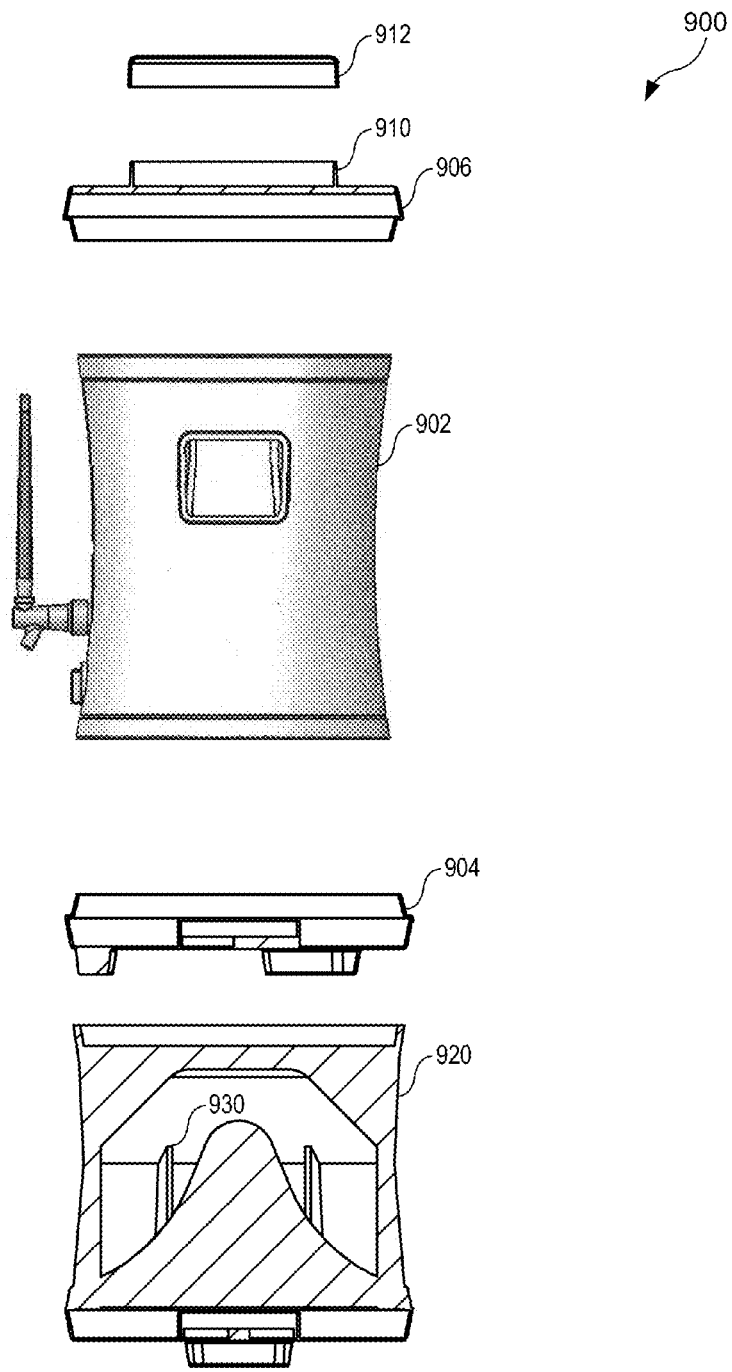
FIG. 9 presents a beverage dispenser system in accordance with one embodiment.

As described above, the disclosed embodiments can include additional features. For example, FIG. 9 illustrates an expanded view of a system 900, which includes an outer shell 902, a base 904, and a top 906. In the illustrated embodiment, outer shell 902 and base 904 are configured as described above with respect to FIGS. 1 and 2.

In the illustrated embodiment, top 906 includes a hatch port 910 and a hatch cover 912. Generally, hatch port 910 is configured to allow access to an aperture of top 906, to allow addition of ice and other beverage mixtures to an inner sleeve within outer shell 902 without requiring removal of top 906. In one embodiment, hatch 910 is configured to restrict access such that ice and liquid can pass through hatch 910, but hands and arms, or leaves and other debris cannot pass through hatch 910. Generally, hatch cover 912 is configured to detachably couple to hatch port 910 and to prevent debris and other unwanted objects from passing through hatch port 910.

In the illustrated embodiment, system 900 also includes a speaker module 920. Generally, speaker module 920 is configured to couple to base 904 and to house a speaker 930, as described in more detail below. In the illustrated embodiment, speaker module 920 is shown as a separate component from base 904. In an alternate embodiment, speaker module 920 is formed as a component of base 904.

Figure 10:
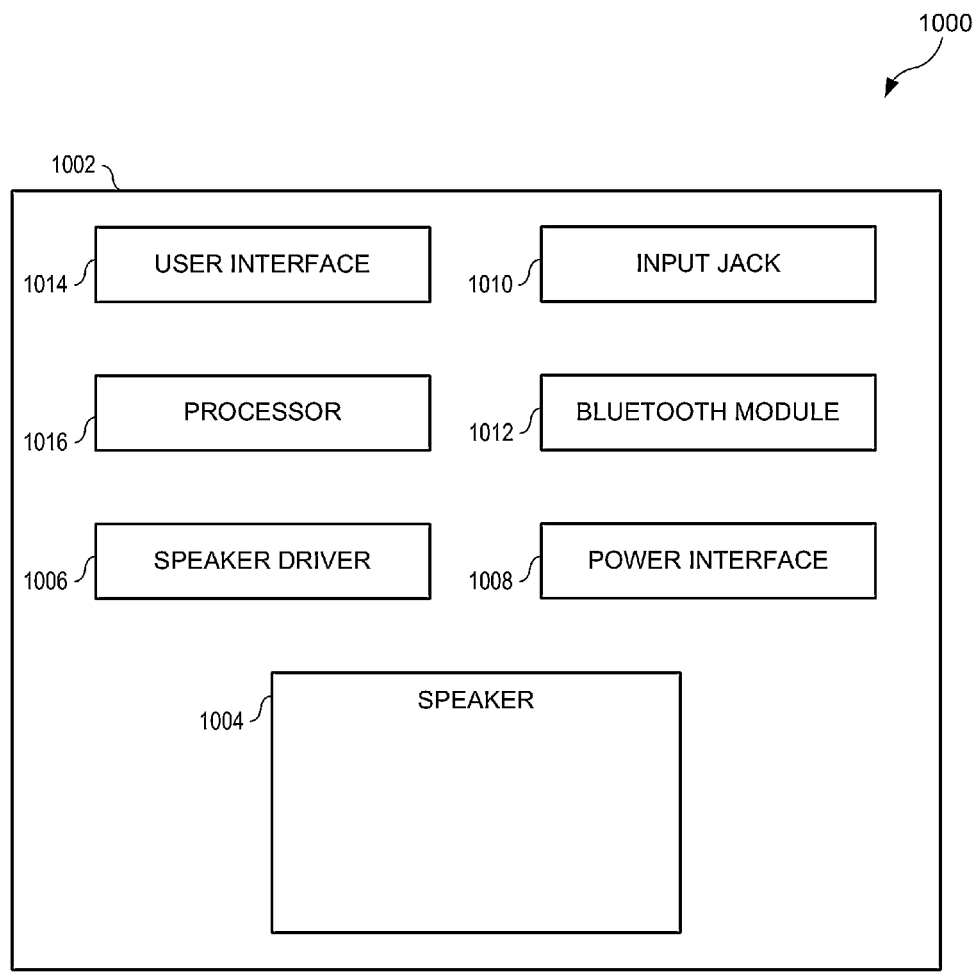
FIG. 10 presents a speaker module of a beverage dispenser system in accordance with one embodiment.

Generally, speaker module 920 is configured to play music and/or other audio in response to user input. FIG. 10 illustrates a block diagram of an exemplary configuration in accordance with one embodiment. Referring now to FIG. 10, a speaker module 1000 includes a housing 1002. Generally, housing 1002 is configured to couple to (or serve as) a base, such as base 904 or speaker module 920 of FIG. 9. Generally, housing 1002 contains additional elements.

For example, housing 1002 includes a speaker 1004. In one embodiment, speaker 1004 is an otherwise conventional audio speaker, configured to generate audio output in response to received input. In the illustrated embodiment, speaker 1004 is shown as a single speaker. In an alternate embodiment, speaker 1004 can be configured as a plurality of speakers.

Generally, speaker 1004 responds to audio input provided by a speaker driver 1006. In one embodiment, speaker driver 1006 is a digital driver. In an alternate embodiment, speaker driver 1006 is an analog or combination analog/digital driver. One skilled in the art will understand that a variety of suitable speaker drivers can be employed.

In the illustrated embodiment, housing 1002 also includes a power interface 1008. Generally, power interface 1008 is configured to receive power from an external power source and to provide power to the various components of speaker module 1000. In an alternate embodiment, power interface 1008 can also be configured to provide power to other component in the system in which speaker module 1000 is employed. Generally, power interface 1008 can be configured to receive AC, DC, and/or inductive power, and in one embodiment, includes a power converter.

In the illustrated embodiment, housing 1002 also includes an input jack 1010. Generally, input jack 1010 is configured to receive audio input from a user device, such as a smartphone, portable MP3 player, personal/tablet computer, headphone line, and/or other suitable user device.

In the illustrated embodiment, housing 1002 also includes a Bluetooth™ module 1012. Generally, Bluetooth™ module 1012 is configured to receive audio and/or other input from a suitable Bluetooth™ device. In one embodiment, Bluetooth™ module 1012 is configured to receive a playlist and associated content from a user device, such as a smartphone, portable MP3 player, personal/tablet computer, and/or other suitable device.

In the illustrated embodiment, housing 1002 also includes a user interface 1014. Generally, user interface 1014 is configured to receive user input. In one embodiment, user input includes control instructions regarding playback of audio input, such as volume, random/normal playback selections, track fast forwarding, etc. In one embodiment, user interface 1014 is a graphical user interface. In one embodiment, user interface 1014 is a collection of knobs and/or buttons programmed with predetermined instructions, such as volume, random/normal playback selections, track fast forwarding, etc.

In one embodiment, Bluetooth™ module 1012 includes logic to pair with another Bluetooth device and wireless transceiver communication circuitry to communicate over at least one version of Bluetooth™ communication protocols. Either the Bluetooth™ module 1012 or the user interface module 1014 includes a switch to prompt the Bluetooth™ module to engage in a pairing process. Alternatively, or in addition to Bluetooth™ module 1012, housing 1002 may also include a wireless communication module for establishing and communicating over IEEE 802.11 (or other) communication protocols. In this embodiment, user interface 1014 provides visual cues to a user to allow the user to establish a communication link with an 802.11 based communication base and to access a specified web site that has audio content. One skilled in the art will appreciate that other configurations can also be employed.

In the illustrated embodiment, housing 1002 also includes a processor 1016. Generally, processor 1016 is an otherwise conventional processor suitable to provide control instructions for the various components of speaker module 1000.

Figure 11:
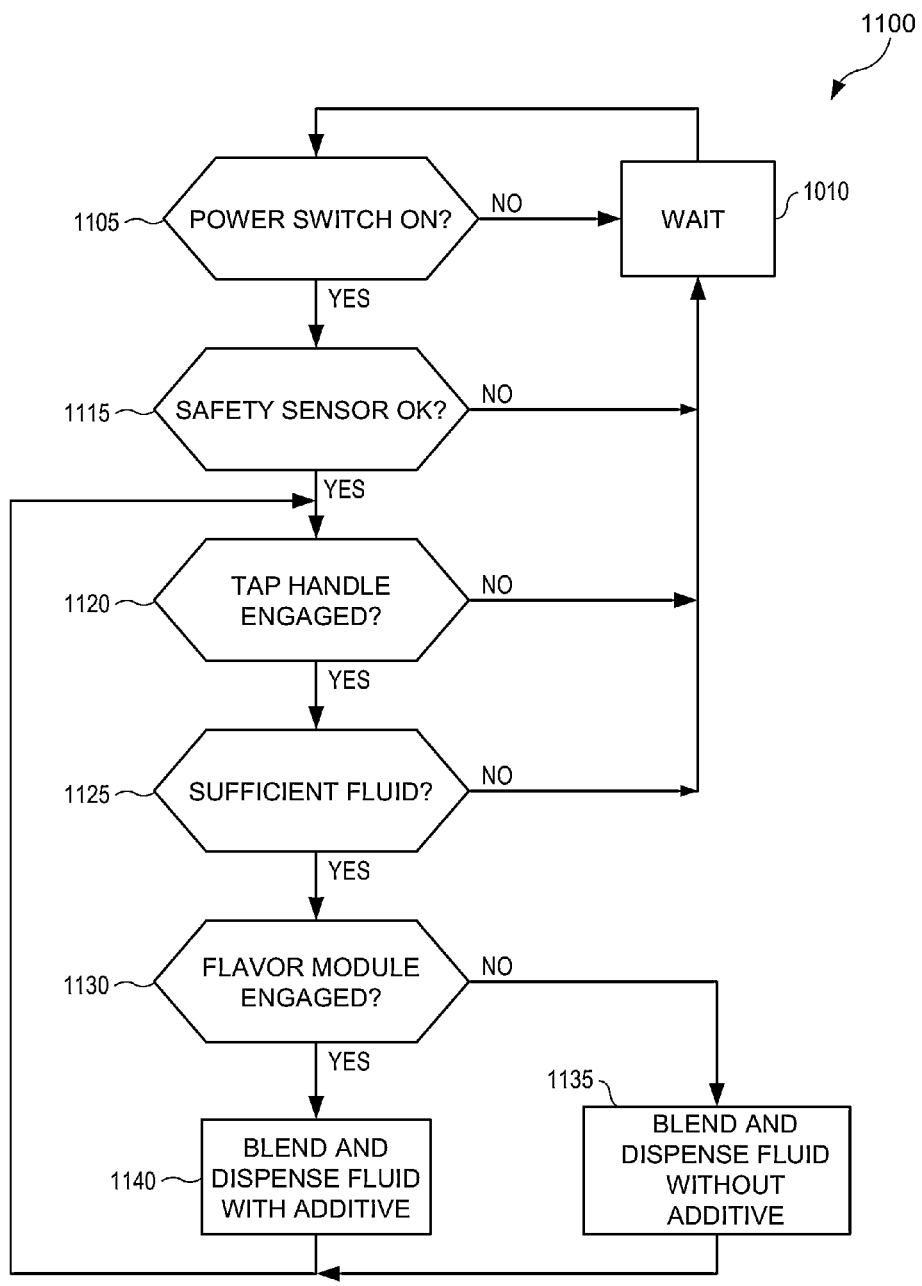
FIG. 11 presents a flow diagram illustrating logical operational steps of a beverage dispenser method, which can be implemented in accordance with one embodiment.

As described above, the disclosed embodiments can be configured to provide a safe, convenient method for dispensing a frozen beverage. FIG. 11 shows a flow diagram 1100 illustrating an exemplary operational process in accordance with one embodiment. In one embodiment, the elements of FIG. 2 perform the operations described below, unless otherwise indicated.

As shown at decisional block 1105, the process begins and the system determines whether the power switch is ON. In one embodiment, the system determines whether the power switch is ON or in an AUTO position. If at decisional block 1105 the power switch is not ON (and/or not in an AUTO position), the process continues along the NO branch to block 1100. As shown at block 1110, the system waits and returns to decisional block 1105. If at decisional block 1105 the power switch is ON, the process continues along the YES branch to decisional block 1115.

Next, as shown at decisional block 1115, the system determines whether the safety sensor is OK. In one embodiment, the safety sensor is OK when the safety sensor indicates that the inner sleeve and outer shell are properly coupled together. If at decisional block 1115 the safety sensor is not OK, the process continues along the NO branch to block 1110. If at decisional block 1115 the safety sensor is OK, the process continues along the YES branch to decisional block 1120.

Next, as shown at decisional block 1120, the system determines whether the tap handle is engaged. If at decisional block 1120 the tap handle is not engaged, the process continues along the NO branch to block 1110. If at decisional block 1120 the tap handle is engaged, the process continues along the YES branch to decisional block 1125.

Next, as shown at decisional block 1125, the system determines whether there is sufficient fluid (i.e., beverage components) within the inner sleeve. If at decisional block 1125 there is not sufficient fluid within the inner sleeve, the process continues along the NO branch to block 1110. If at decisional block 1120 there is sufficient fluid within the inner sleeve, the process continues along the YES branch to decisional block 1130.

Next, as shown at decisional block 1130, the system determines whether the flavor module is engaged. If at decisional block 1125 the flavor module is not engaged, the process continues along the NO branch to block 1135. Next, as shown at block 1135, the system blends the beverage mixture and dispenses the resultant fluid (i.e., the beverage for consumption) without also adding a flavor additive. In the illustrated embodiment, the process returns to decisional block 1120. In an alternate embodiment, the process returns to decisional block 1105.

If at decisional block 1125 the flavor module is engaged, the process continues along the YES branch to block 1140. Next, as shown at block 1140, the system blends the beverage mixture and dispenses the resultant fluid (i.e., the beverage for consumption) and injects a flavor additive. In the illustrated embodiment, the process returns to decisional block 1120. In an alternate embodiment, the process returns to decisional block 1105.

Thus, the disclosed embodiments can be configured to provide a number of features not available in prior systems and methods. As described above, in one embodiment, a beverage dispenser system includes a tap module with a magnetic switch. For example, FIG. 12 shows a collection 1200 of illustrations showing a beverage dispense system according to one embodiment.

Figure 12:
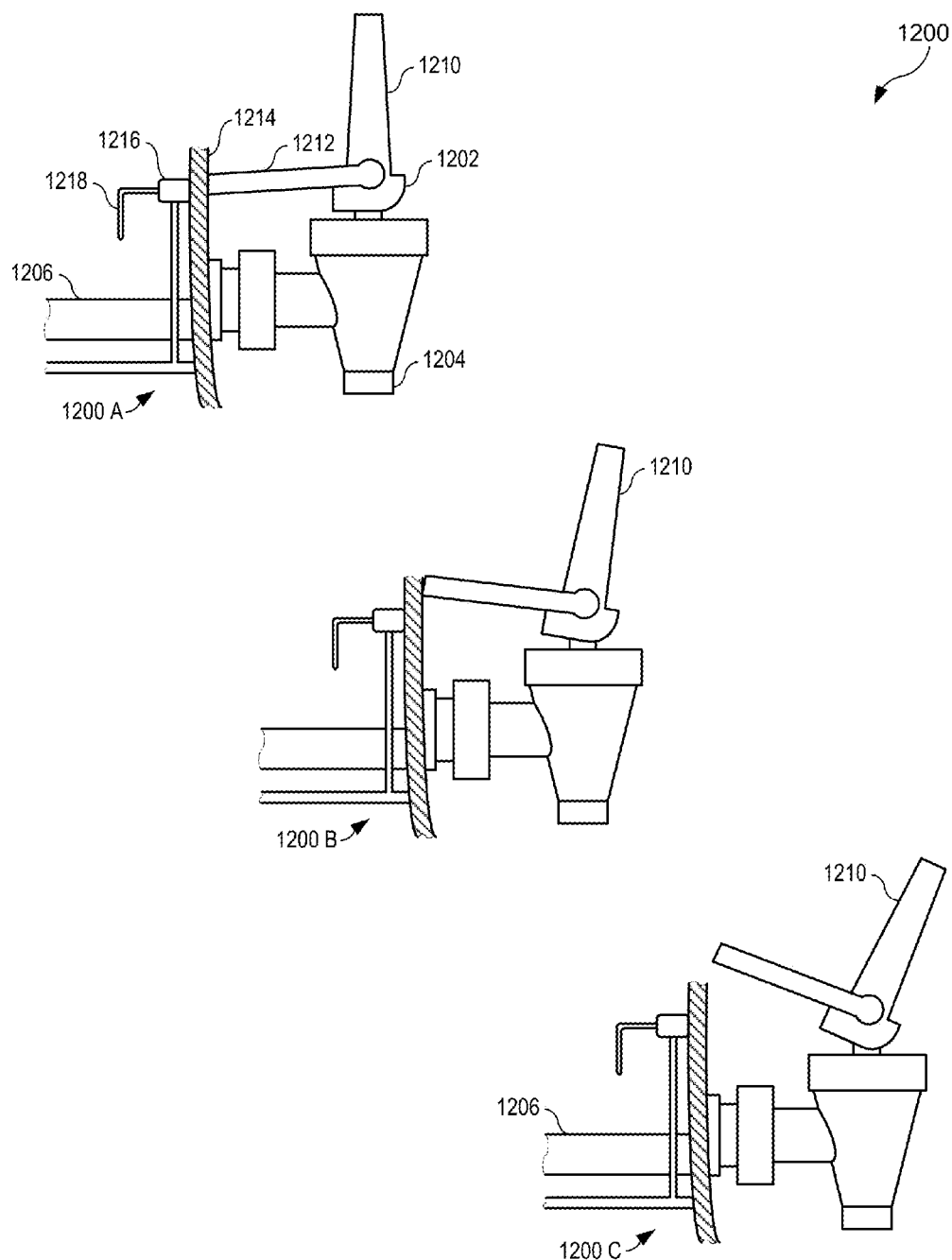
FIG. 12 presents a number of state configurations of a beverage dispenser system in accordance with one embodiment.

Referring now to FIG. 12, diagram 1200A illustrates a tap control 1202 coupled to a tap spout 1204 and a beverage port 1206 (coupled to an inner sleeve and/or outer sleeve beverage port). In the illustrated embodiment, tap handle 1210 is in a "neutral" position, the motor is OFF, and flow from spout 704 is OFF.

As shown, a magnetic bar 1212 couples to a sensor 1216 through outer shell 1214. A control lead 1218 runs to a motor (not shown). In the illustrated neutral position, the magnetic bar 1212 is close enough to make magnetic contact with sensor 1216. In the illustrated embodiment, the end of magnetic bar 1212 distal from tap handle 1210 makes contact with sensor 1216. One skilled in the art will appreciate that other suitable configurations can also be employed.

Diagram 1200B illustrates a "blend" position. In the illustrated embodiment, tap handle 1210 is slightly offset from the neutral position, away from beverage port 1206, the motor is ON, and flow from spout 1204 is OFF. In the illustrated embodiment, the distal end of magnetic bar 1212 is moved away from contact 1216 by a distance 1220. Distance 1220 can be configured based on the particular characteristics of contact 1216 and magnetic bar 1212.

Diagram 1200C illustrates a "dispense" position. In the illustrated embodiment, tap handle 1210 is more offset from the neutral position than the "blend" position, away from beverage port 1206, the motor is ON, and flow from spout 704 is ON. In the illustrated embodiment, the distal end of magnetic bar 1212 is moved away from contact 1216 by a distance 1222. Distance 1222 can be configured based on the particular characteristics of contact 1216 and magnetic bar 1212. Thus, FIG. 12 illustrates one configuration of control inputs and control states for the disclosed embodiments, in accordance with one embodiment.

Thus, generally, system 100 and the other embodiments disclosed herein offer a number of technical advantages over other methods and systems. As described above, prior art systems typically suffer from various challenges. For example, typical systems that can support a high-capacity are not suitable for portable operation, while portable systems are typically unable to provide high-capacity. Similarly, typical systems that can maintain an even consistency and frozen/blended state throughout the beverage are not suitable for portable operation. But typical beverage portability systems cannot adequately maintain an even consistency and/or frozen/blended state throughout the beverage. The disclosed embodiments overcome these and other challenges associated with prior art systems and methods.

For example, the disclosed embodiments can be configured to provide consumers with increased blended beverage volume over conventional portable beverage storage/production approaches. Moreover, the disclosed embodiments can also be configured to provide an easy way to pour with the proper mixture because every pour will trigger the blender to recirculate the ice and liquids to create the perfect consistency in a drink.

Additionally, the disclosed embodiments can be configured with a cone-shaped inner sleeve, which offers a better cyclone mixing effect than traditional multi-gallon blenders, especially portable blenders and portable storage/production approaches. Additionally, the disclosed embodiments can be configured with improved ice packs and ice storage, which keeps the frozen beverages cooler and more-consistently frozen than typical portable storage/production systems.

Thus, generally, the disclosed embodiments provide superior mixing and blending as the frozen beverages are dispensed. The user operation of the tap handle causes the disclosed embodiments to blend the frozen beverage and then dispense the blended beverage with each pour, an advancement over typical frozen beverage dispensers. Additionally, the disclosed embodiments are generally configured for ease of portability, providing superior blended beverages in locations where a typical fixed-location frozen beverage system is impractical. Moreover, the disclosed embodiments are configured for cost-effective portable frozen beverage dispensation, increasing user satisfaction while maintaining high quality for the ultimate consumer of the frozen beverage.

Additionally, the disclosed embodiments can be configured with a see-through gauge allowing a user to check volume levels of the beverage mixture without having to open the lid and release the cold air stored inside the system. Additionally, the disclosed embodiments can be configured with a stand configured with a sound system, allowing the user to play music through the base. These additional features enhance the user experience and contribute to the atmosphere in the location where the disclosed embodiments are employed.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A system for dispensing a beverage, comprising:
a conical inner sleeve comprising a first beverage port;
the conical inner sleeve being configured to receive a mixture of beverage components and to receive a first blade and a blade arm;
wherein the first blade couples to a first end of the blade arm;
an outer shell comprising a second beverage port, the outer shell being configured to receive the first blade and blade arm, and to receive the inner sleeve;
a top configured to couple the inner sleeve and the outer shell in a fixed position, the fixed position being configured to align the first beverage port and the second beverage port;
a tap module coupled to the outer shell, the tap module comprising a third beverage port, a tap handle, and a tap control;
the tap module being configured to couple to the outer shell to align the third beverage port with the second beverage port;
the tap handle being configured to restrict flow through the third beverage port in a first position and to permit flow through the third beverage port in a second position;
the tap control being configured to detect whether the tap handle is in the first position or the second position;
a motor coupled to the tap control, the tap control being further configured to control the motor, wherein the tap control prevents the motor from operation while the tap handle is in the first position, wherein the tap control engages the motor while the tap handle is in the second position;
the motor being configured to rotate the blade arm so as to rotate the first blade, in response to control by the tap control; and
a base unit configured to house the motor and to couple to the outer shell.

2. The system of claim 1, further comprising:
wherein the inner sleeve further comprises a first view port, the first view port being configured to allow visual inspection of the mixture of beverage components; and
wherein the outer shell further comprises a second view port, the second view port being configured to allow visual inspection of the mixture of beverage components through the first view port.

3. The system of claim 1, further comprising:
wherein the inner sleeve further comprises a notch; and
wherein the outer shell further comprises a channel, the channel being configured to receive the notch.

4. The system of claim 1, wherein the outer shell further comprises hand grips.

5. The system of claim 1, wherein the outer shell further comprises an insulation layer.

6. The system of claim 1, wherein the outer shell further comprises an ice pack module.

7. The system of claim 1, wherein the tap control further comprises a magnetic sensor.

8. The system of claim 1, wherein the tap control further comprises a fluid level sensor.

9. The system of claim 8, wherein the tap control is further configured to control operation of the motor based on a fluid level detected by the fluid level sensor.

10. The system of claim 1, further comprising a second blade coupled to the blade arm, the second blade being configured to rotate with the blade arm.

11. The system of claim 1, further comprising
a second blade coupled to the blade arm, the second blade being configured to rotate with the blade arm; and
wherein the first blade and the second blade are configured with different shapes.

12. The system of claim 1, further comprising
a second blade coupled to the blade arm, the second blade being configured to rotate with the blade arm; and
wherein the second blade is configured with a shape suitable for chopping ice.

13. The system of claim 1, further comprising
a second blade coupled to the blade arm, the second blade being configured to rotate with the blade arm; and
wherein the tap control is further configured to engage the second blade only if a fluid level in the inner sleeve is sufficient to submerge the second blade.

14. The system of claim 1, further comprising:
a flavor module coupled to the tap module;
the flavor module comprising a forth beverage port configured to align with the third beverage port; and
the flavor module further configured to inject a flavor additive into liquid passing through the third beverage port.

15. The system of claim 1, further comprising a safety switch configured to prevent motor operation unless the inner sleeve and the outer shell are coupled in the fixed position.

16. The system of claim 1, wherein the tap control comprises a three-way power switch.

17. The system of claim 1, further comprising:
a speaker module coupled to the base unit; and
the speaker module being configured to receive audio input and to generate audible output based on received audio input.

18. The system of claim 1, wherein the base unit further comprises a speaker module, the speaker module being configured to receive audio input and to generate audible output based on received audio input.

19. The system of claim 1, further comprising:
a speaker module coupled to the base unit;
the speaker module comprising a user interface and an input port, the input port being configured to receive audio input; and
the speaker module being further configured to generate audible output based on received audio input.

20. The system of claim 1, wherein the top further comprises a hatch configured to allow access to the inner shell without decoupling the inner sleeve and the outer shell.

* * * * *